W. J. WOODS.
APPARATUS FOR WORKING GLASS.
APPLICATION FILED NOV. 30, 1914.
1,157,653.
Patented Oct. 19, 1915.
2 SHEETS—SHEET 2.
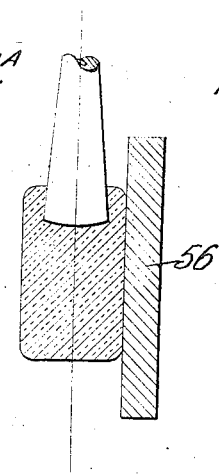
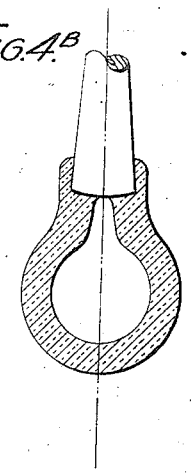
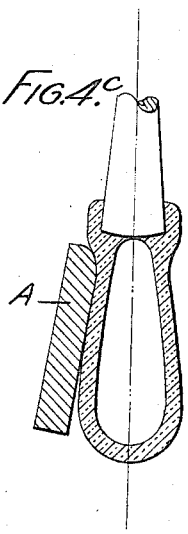
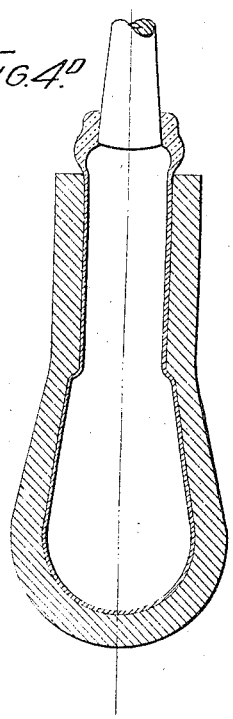
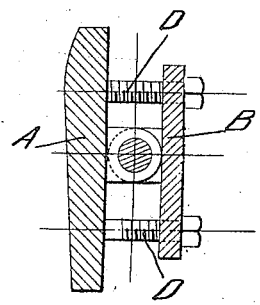
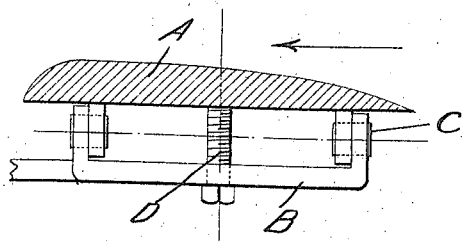
Witnesses
Inventor
William J. Woods
By
Attorney

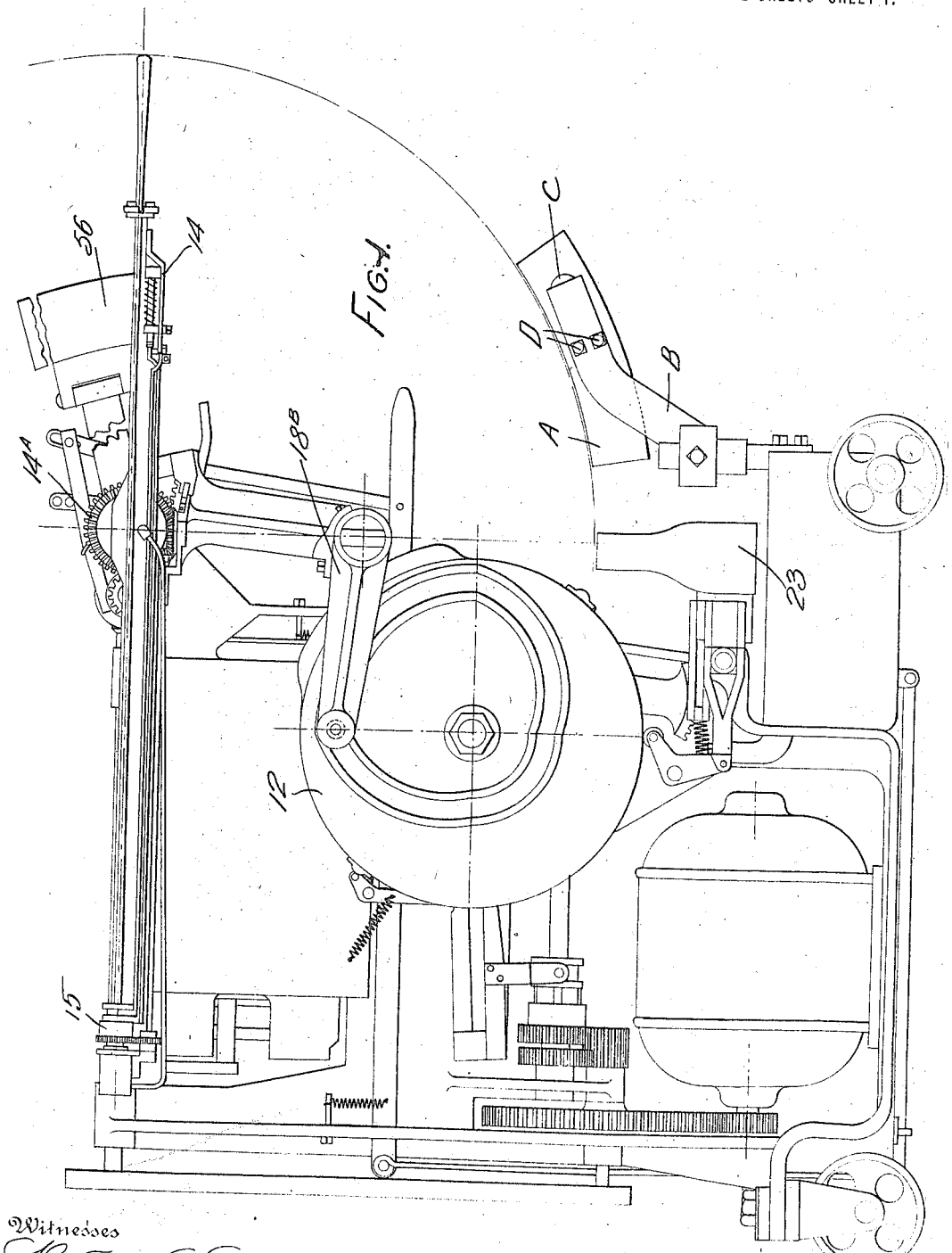

UNITED STATES PATENT OFFICE.

WILLIAM JAMES WOODS, OF CORNING, NEW YORK, ASSIGNOR TO EMPIRE MACHINE COMPANY, A CORPORATION OF MAINE.

APPARATUS FOR WORKING GLASS.

1,157,653.

Specification of Letters Patent.

Patented Oct. 19, 1915.

Application filed November 30, 1914. Serial No. 874,844.

*To all whom it may concern:*

Be it known that I, WILLIAM JAMES WOODS, a citizen of the United States of America, and a resident of Corning, New York, have invented certain new and useful Improvements in Apparatus for Working Glass, of which the following is a specification.

This invention relates to certain new and useful improvements in mechanisms adapted for use in shaping glass masses preliminary to the final blowing thereof.

In the machine in connection with which it is the primary purpose to use the subject-matter of the present invention, glass is gathered on the end of a blow-iron and is then marvered upon such blow-iron to form a blank with a proper surface. Air is then admitted to form the initial cavity in the blank and the marvered glass mass is then, by a movement of the blow-pipe around a horizontal pivot presented vertically to a mold for final blowing. Such a machine is shown in the prior application of B. D. Chamberlin, for apparatus for production of glass articles, filed Jan. 13, 1911, Serial No. 602,532, which application since the filing of this application has on Jan. 12, 1915, matured into Patent No. 1,124,698.

In the production of certain kinds of articles, and particularly in the production of lamp bulbs having small necks, I have found it desirable to subject the marvered blank to a blocking action preferably localized at such portion of the mass as will form the restricted portion of the finished article, such blocking to take place subsequent to the formation of the cavity hereinbefore referred to.

My invention consists therefore, in the construction, combination and arrangement of the several parts of which it is composed, as will be hereinafter more fully described and claimed.

Referring to the accompanying drawings, in which corresponding parts are designated by corresponding marks of reference, Figure 1 is a side elevation of a glass-working machine having my invention applied thereto. Fig. 2 is a section through the wiper plate shown in Fig. 1. Fig. 3 is a plan view of the wiper. Fig. 4 is a series of diagrammatic views representing the formation of a glass mass, according to this invention.

Inasmuch as my invention does not concern itself with details of mechanism, except in so far as the same may relate to the blocking action, and inasmuch as a machine to which my invention may be employed is fully described in said application of Chamberlin before referred to, it is not necessary for me in this application, to describe in detail, the general mechanism of such a machine, and reference is hereby made to the said application of Chamberlin for a description of one form thereof to which my invention may be applied. For present purposes, it is sufficient to state that as shown in Fig. 1, such machine may comprise a blow-pipe-receiving frame 14 adapted to be swung around a horizontal pinion at $14^a$ by proper mechanism which may include a crank arm $18^b$ and a cam disk 12, the latter to be driven intermittently from a suitable source of power, and through appropriate connections. As disclosed in the said application of Chamberlin, the driving connection is such that when a blow-pipe is inserted in the frame and the mechanism started, the gather end of the blow-pipe will be raised, which, in connection with the rotation of the blow-pipe, will roll the glass along a marverer 56, after which the gather end of the blow-pipe will be lowered, the glass at this time being out of contact with the marverer, puff air being admitted through the chuck 15 also at this time to form a cavity in the blank. Upon the continued lowering of the marvered glass, it is properly positioned in respect to mold parts 23, and after a proper time for elongation has elapsed, such mold parts are closed upon the blank, and the article blown through air admitted through the chuck 15.

The matter to which this invention relates is, as before stated, a blocking action acting upon the glass after the preliminary marvering and the introduction of the puff air therein and prior to the final blowing. In the embodiment of mechanism herein shown for this purpose, a wiper plate A is located adjacent to the path of the downward swing of the marvered glass and along it the marvered blank having a cavity therein, is rolled on the movement of such glass to the blowing position. As shown this plate A may be mounted upon a bracket B, arising from the base of the machine, the working surface of the plate having beveled ends to cause the glass to come into and leave contact therewith gradually.

The wiper plate is, by preference, hinged to its supporting bracket B by a pivot C which is substantially tangential to the center of movement of the blow-pipe frame, while set screws D are employed to shift the supplemental marverer on such pivot whereby the inclination of the marvering surface to the radial line and in respect to the longitudinal axis of the blow-pipe, may be varied.

The wiper plate may either be so set as to contact with the whole surface of the marvered glass, or by preference with only the part thereof which is to form the reduced portion of the finished article. In any event, the glass on the blow-pipe is first marvered on the marvering plate 56, (see Fig. 4ª) and has the initial cavity formed therein, as shown in Fig. 4ᵇ, after which it is subjected to the action of the wiper plate.

Taking the specific case of the formation of a lamp bulb with the narrow neck, the wiper plate in the preferred embodiment of my invention is set to contact only with that portion of the marvered blank which is to form the reduced neck of the bulb, and by preference has its working face convex in radial section. This results not only in a local reduction of the diameter of the blank to permit the closing of a small-necked mold about the blank, but also, if the wiper plate is maintained at proper temperature locally cools such portion of the blank, and thereby prevents a too greater thinning of the walls of the blank at this point during elongation under the weight of the lower path of the gather. This action of the wiper plate is shown in Fig. 4ᶜ. Fig. 4ᵈ shows a bulb which may be formed by the manipulation above described.

Having thus described my invention what I claim as new, and desire to secure by Letters Patent is:—

1. The combination with a glass-carrying spindle, of a marvering plate, a wiper plate, a mold mechanism and means for marvering the glass upon the spindle on the marvering plate for forming an initial cavity in such glass by the introduction of puff air, for blocking the puffed blank upon the wiper plate to reduce its diameter, and for positioning the glass in coöperative relation to the mold.

2. The combination with a glass-working spindle, of means for marvering glass thereon, a mold, means for moving the glass from the marvering means to the mold, a wiper plate located adjacent to the path of such movement and adapted to contact with the marvered blank prior to the molding thereof to locally chill a part thereof which is to be blown, and means for introducing puff air into the marvered blank prior to the action of the wiper plate thereon, and for blowing the marvered glass in the mold subsequent to the action of the wiper plate thereon, substantially as described.

3. The combination with a blowing mold, of a glass-carrying spindle, means for introducing puff air into glass carried by the said spindle to swell the same, means for presenting the glass on the said spindle to the mold, a wiper plate, and means for causing contact between it and a part only of the glass subsequent to the introduction of the puff-air and prior to the closing of the mold whereby the glass is locally chilled and reduced in diameter.

In testimony whereof I hereunto affix my signature in the presence of two witnesses.

WILLIAM JAMES WOODS.

Witnesses:
 FRED. C. CAMERON,
 G. WILLIS DRAKE.